(12) United States Patent
Cho et al.

(10) Patent No.: US 7,505,521 B2
(45) Date of Patent: Mar. 17, 2009

(54) DATA TRANSMISSION SYSTEM AND METHOD

(75) Inventors: Jeong-Hyeon Cho, Seoul (KR); Jae-Jun Lee, Yongin-si (KR); Jong-Hoon Kim, Gyeonggi-do (KR); Byung-Se So, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 927 days.

(21) Appl. No.: 10/913,359

(22) Filed: Aug. 9, 2004

(65) Prior Publication Data

US 2005/0089106 A1    Apr. 28, 2005

(30) Foreign Application Priority Data

Oct. 27, 2003    (KR) .................... 10-2003-0075269

(51) Int. Cl.
*H04B 3/00*    (2006.01)

(52) U.S. Cl. ...................................... 375/257; 227/233
(58) Field of Classification Search ................ 375/257, 375/318, 258, 297; 227/233; 365/205, 208
See application file for complete search history.

(56) References Cited

U.S. PATENT DOCUMENTS

| 6,069,927 | A | 5/2000 | Kikuchi |
| 6,295,323 | B1 | 9/2001 | Gabara |
| 2002/0175749 | A1 | 11/2002 | Hedberg et al. |
| 2003/0042957 | A1* | 3/2003 | Tamura ...................... 327/233 |
| 2003/0210575 | A1* | 11/2003 | Seo et al. ................. 365/189.05 |

* cited by examiner

*Primary Examiner*—Khai Tran
(74) *Attorney, Agent, or Firm*—Volentine & Whitt, PLLC (57) ABSTRACT

A data transmission system and method characterized by the use of multiple differential output amplifiers to transmits differential data signals that vary in accordance with control signals derived from a reference data output strobe signal, and multiple differential amplifiers to receive the differential data signals and detect such variations to generate a data input strobe signal corresponding to the data output strobe signal.

20 Claims, 9 Drawing Sheets

DATA TRANSMISSION SYSTEM AND METHOD

BACKGROUND OF THE INVENTION

1. Field of the Invention

The present invention relates to a data transmission system and, more particularly, to a data transmission system and method adapted to simultaneously transmit a differential signal pair and a common signal through a differential signal line pair. A claim of priority is made to Korean Patent Application No. 2003-75269 filed Oct. 27, 2003 in the Korean Intellectual Property Office, the disclosure of which is hereby incorporated by reference in its entirety.

2. Description of the Related Art

A conventional data transmission method is characterized by separate approaches to the transmission of a so-called "single or common" signal and a differential signal pair. Namely, the method transmits the single signal through a single signal line, but transmits the differential signal pair through a differential signal line pair. The differential signal pair includes one signal having a voltage level higher than a reference voltage and another signal having a voltage lower than the reference voltage. As a result, when single bit data is transmitted, the differential signal pair approach to data transmission twice as many data lines, as compared with the single signal approach to data transmission.

Thus, a method of transmitting data that uses the common signal approach is able to transmits more data than a method using a differential signal pair approach for a given number of signal lines. However, in applications wherein a data signal is transmitted at a high frequency, common signal methods of transmission are highly sensitive to a noise. In contrast, method of data transmission using the differential signal pair approach enjoy relatively strong noise immunity. Thus, both approaches to data transmission have relative benefits and disadvantages.

The relative benefits of common signal transmission methods notwithstanding, most contemporary data transmission methods use a differential signal pair approach to data transmission because data accuracy is of paramount importance, and both the quantity data and the speed with which data is transmitted are constantly increasing. Accordingly, transmission noise is a consistent problem, and conventional data transmission systems typically include the numerous signal lines required to implement a differential signal pair approach to data transmission.

Thus, where a method of transmitting a differential signal pair is used, a corresponding system board will include at least twice as many signal lines as the number of data bits being transmitted by the system. In actuality, more signal lines are required in a competent data transmission system. For example, one or more data strobe signal(s), (i.e., a clock signal that is used as a reference signal controlling data input/output (I/O) operations) is typically transmitted by the system for a grouping of data bits. In current implementations, a 32-bit I/O device mounted on a system board might additionally transmit one data strobe signal per each respective grouping of 4, 8, or 16 bits of data.

Additional signal lines necessitate an increased pin count for related transmission devices, and lead to increased probabilities of manufacturing errors in increasingly crowded system boards. In sum, the number of signal lines required to conventionally transmit data using a differential signal pair approach, taken together with the additional overhead signal lines required to transmit control signals, such as data strobe signals, is simple too great. Manifest implementation and operational improvements would arise from a reduced number of signal lines in data transmission systems.

SUMMARY OF THE INVENTION

It is an object of the present invention to provide a data transmission system and method which can reduce the number of signal lines by simultaneously transmitting a differential data signals and a reference signal through a differential signal line pairs.

It is another object of the present invention to provide a data transmission system and method that reduces data transmission errors caused by noise effects upon a high frequency reference signal transmitted via a differential signal line pair.

In order to achieve the above and other objects, the present invention provides in a first aspect a data transmission system, generally comprising a transmitter and a receiver.

The transmitter comprises a divider circuit converting a data output strobe signal (e.g., the reference signal) into a plurality of divided data strobe signals, each divided data strobe signal having a lower frequency than the data output strobe signal, a first plurality of differential output amplifiers transmitting differential data signals via a plurality of differential output signal pairs, a second plurality of differential output amplifiers, each one of the second plurality of differential output amplifiers receiving a divided data strobe signal and generating an output control signal, and a plurality of signal level varying circuits, wherein each signal level varying circuit variably current loads a corresponding differential output signal pair in responsive to an output control signal received from a corresponding one of the second plurality of differential output amplifiers.

The receiver comprises a first plurality of differential input amplifiers receiving the differential data signals from the plurality of differential output signal pairs, a plurality of signal level detecting circuits, each signal level detecting circuit detecting a variation in the differential data signals on a corresponding differential signal line pair and generating an input control signal in response to the variation, a second plurality of differential input amplifiers, each one of the second plurality of differential input amplifiers receiving an input control signal from a corresponding signal level detecting circuit and generating a corresponding data strobe signal portion, and a multiplier receiving a plurality of data strobe signal portions from the second plurality of differential input amplifiers, and generating a data input strobe signal having a higher frequency than the plurality of data strobe signal portions and corresponding to the data output strobe signal.

In another aspect, the present invention provides a data transmission system, comprising a plurality of differential output signal pairs, wherein each one of the plurality of differential output signal pairs communicates differential data signals between a transmitter to a receiver, wherein the transmitter generates a data output strobe signal and the receiver is responsive to a data input strobe signal corresponding to the data output strobe signal, wherein the data output strobe signal is frequency divided into a plurality of divided data strobe signals, each one of the of divided data strobe signals varying the voltage level of a corresponding set of differential data signals in response to variations in the data output strobe, and wherein the receiver further comprises a multiplier circuit generating the data input strobe signal in response to detected variations in the voltage of the differential data signals.

In yet another aspect, the present invention provides a data transmission method, comprising the steps of; frequency converting a data output strobe signal to generate a plurality of divided data strobe signals, transmitting a plurality of differential data signals via a corresponding plurality of differential output signal pairs, wherein the voltage level of each differential data signal is varied in accordance with a divided data strobe signal, receiving the plurality of differential data signals via the corresponding plurality of differential output signal pairs, detecting variations in the voltage level of each one of the plurality of differential data signals, and generating a data input strobe signal in response to the detected variations in the voltage level of each one of the plurality of differential data signals.

BRIEF DESCRIPTION OF THE DRAWINGS

The above and other features and advantages of the present invention will become more readily apparent to those of ordinary skill in the art by describing several presently preferred embodiments with reference to the attached drawings. In the drawings, like reference numbers generally refer to like elements throughout the specification.

In the drawings.

DETAILED DESCRIPTION OF THE INVENTION

The present invention will now be described more fully with reference to the accompanying drawings in which presently preferred embodiments of the invention are shown. However, the preferred embodiments are merely examples teaching the making and use of the present invention. Those of ordinary skill in the art will recognize that the present invention is susceptible to implementation in a numerous variations, modifications and adaptations. Thus, the present invention may be embodied in different forms and is not limited in its scope to the illustrated embodiments set forth herein.

Figure 1:
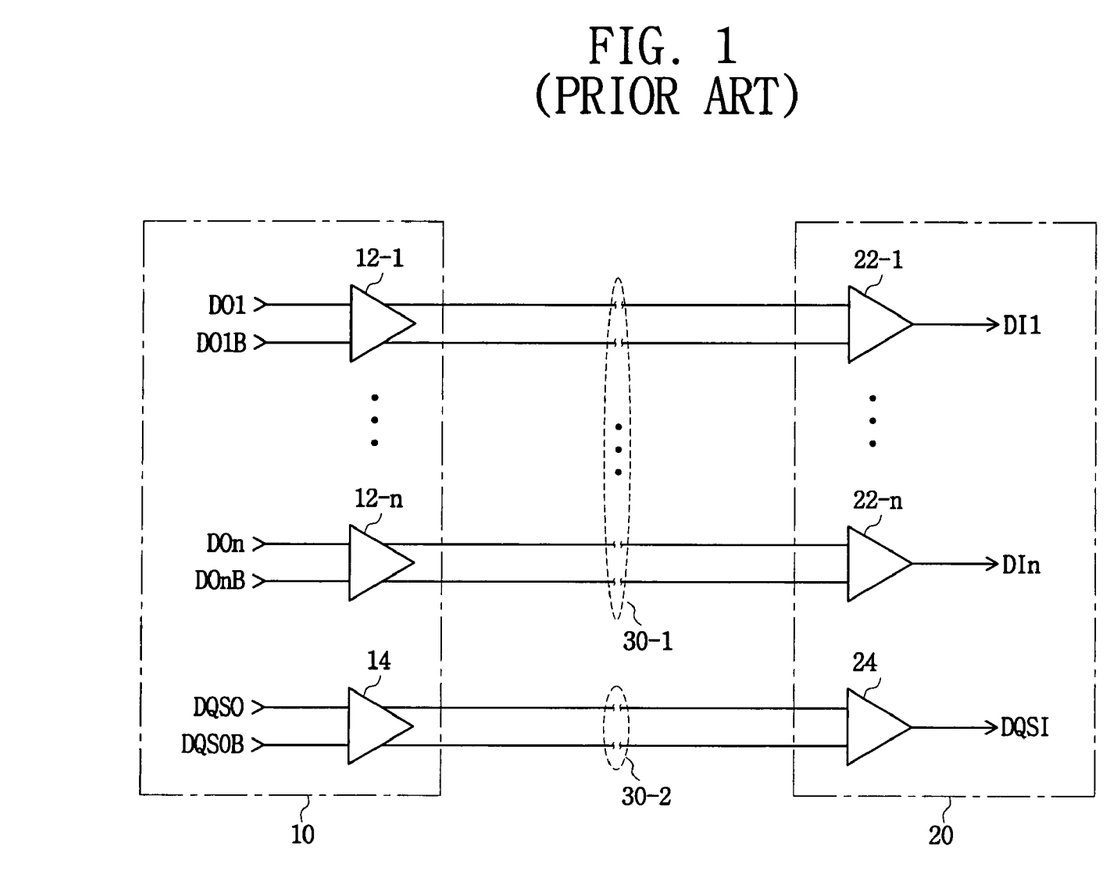
FIG. 1 is a block diagram illustrating a conventional data transmission system.

FIG. 1 is a block diagram illustrating a conventional data transmission system. The data transmission system of FIG. 1 includes a transmitter 10, a receiver 20, a plurality of differential signal line pairs 30-1, and a data strobe signal line pair 30-2. Transmitter 10 includes a plurality of differential output amplifiers 12-1 through 12-n, and 14. Receiver 20 includes a corresponding plurality of differential input amplifiers 22-1 through 22-n, and 24.

In FIG. 1, DO1,DO1B through DOn,DOnB denote output signal pairs generated by transmitter 10, and DQSO,DQSOB denotes a data strobe signal pair generated together with the output signal pairs in transmitter 10. DI1 through DIn denote input signals developed by receiver 20. DQSI denotes a data strobe signal developed together with the input signals in receiver 20.

A conventional data transmission method will now be explained in the context of the illustrative data transmission system shown in FIG. 1.

Differential output amplifiers 12-1 through 12-n and 14 amplify respective differences of output signal pairs DO1, DO1B through DOn,DOnB and data strobe output signal pair DQSO,DQSOB, which are internally generated in transmitter 10, to output through the respective differential signal line pairs 30-1, and the data strobe signal line pair 30-2. Differential input amplifiers 22-1 through 22-n and 24 of receiver 20 receive and amplify the respective differences of differential signal pairs and a data strobe signal pair, which are transmitted through the differential signal line pairs 30-1 and the data strobe signal line pair 30-2, to generate input signals DI1 to DIn and data strobe input signal DQSI, respectively.

As shown in FIG. 1, the conventional data transmission system requires "2×n" differential signal line pairs and 2 data strobe signal lines in order to transmit "n" differential signal pairs and one data strobe signal. Therefore, when a data transmission system is adapted to use a method of transmitting differential signal pairs, the number of data strobe signal lines as well as the number of differential signal line pairs is increased.

The data transmission system of FIG. 1 has a configuration wherein one data strobe signal line pair is arranged for each of "n" differential signal line pairs. Given this architecture, when the number of differential signal line pairs increases, the number of data strobe signal line pairs also increases. Thus, the total number of signal lines is undesirably increased. Further, the conventional data transmission system of FIG. 1 provides a differential signal line pair for the data strobe signals, but such signals are not normally generated with the transmitter in a differential signal form.

Figure 2:
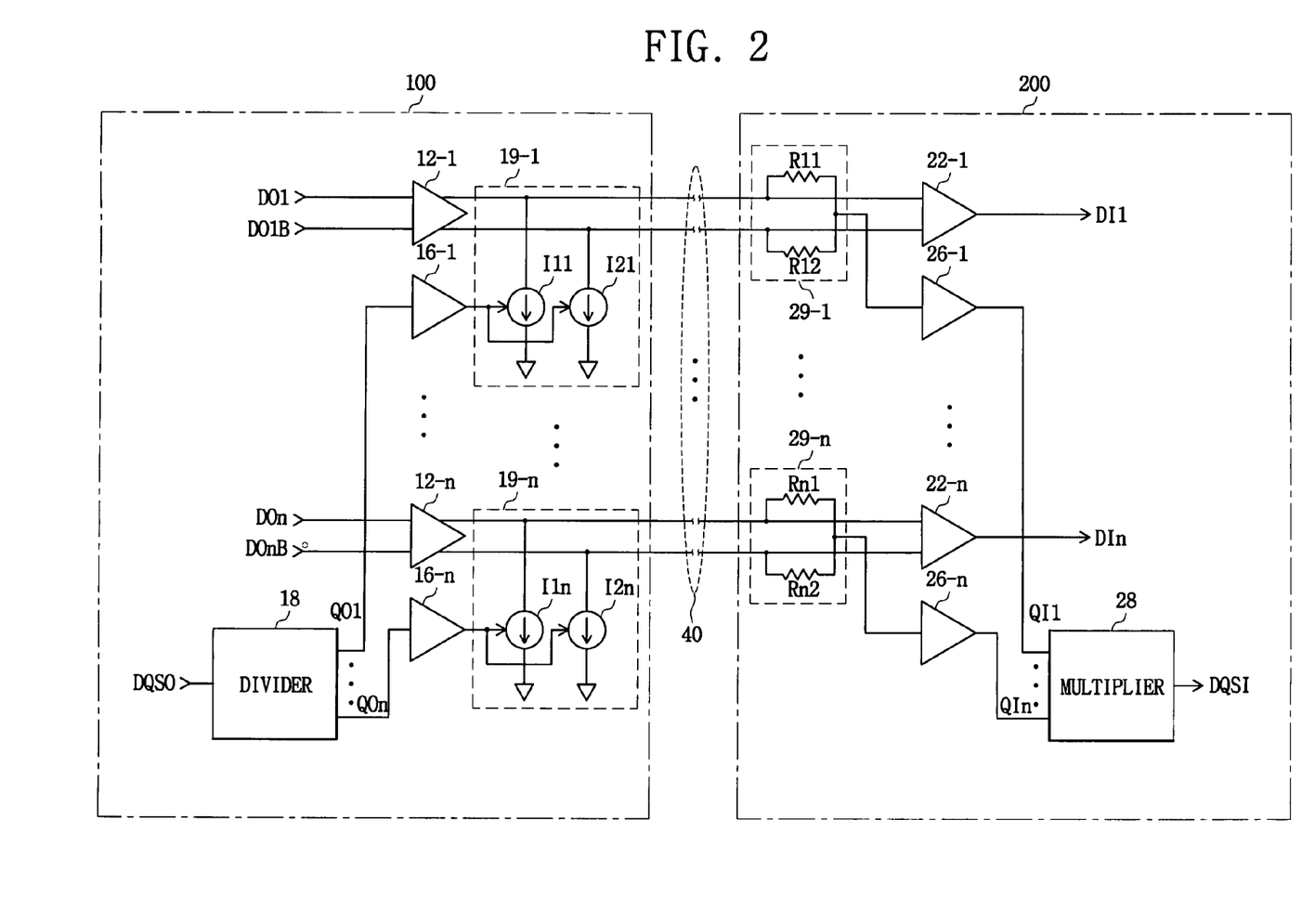
FIG. 2 is a block diagram illustrating a data transmission system according to a first embodiment of the present invention.

FIG. 2 is a block diagram illustrating a data transmission system according to a first embodiment of the present invention. The data transmission system of FIG. 2 generally includes a transmitter 100, a receiver 200, and a plurality of differential line pairs 40.

Transmitter 100 preferably includes a first plurality of differential output amplifiers 12-1 through 12-n, and a second plurality of differential output amplifiers 16-1 through 16-n. Transmitter 100 further includes a plurality of signal level varying circuits 19-1 though 19-n associated with a combination differential amplifiers selected from the first and second pluralities of differential output amplifiers (e.g., 12-1 and 16-1). Each one of the plurality of signal level varying circuits preferably includes driving current sources (e.g., I11 and I21) configured to receive signals from the first and second pluralities of differential output amplifiers.

Receiver 200 preferably includes a first plurality of differential input amplifiers 22-1 through 22-n, and a second plurality of input amplifiers 26-1 through 26-n. Receiver 200 further includes a plurality of signal level detecting circuits 29-1 through 29-n, respectively associated with a combination of differential amplifiers selected from the first and second pluralities of differential amplifiers. Each one of the plurality of signal level detecting circuits preferably includes a parallel resistor combination (e.g., R11 and R12) configured generate a signal applied to multiplier 28.

In FIG. 2, DO1,DO1B through DOn,DOnB, DQSO, DI1 through DIn, and DQSI denote signals similar to those described with reference to FIG. 1. The function and interoperation of the components described in the example shown in FIG. 2 will now be are explained.

First differential output amplifiers 12-1 through 12-n and first differential input amplifiers 22-1 through 22-n are similar in function and construction to that of the conventional output and input differential amplifiers described with reference to FIG. 1. However, a divider 18 provides a divided portion of the data output strobe signal (DQSO) from each of "n" outputs, where each respective divided data strobe signal is applied to a signal level varying circuit (e.g., 19-1). In effect, divider 18 performs a frequency conversion function converting the relatively high frequency data output strobe signal (DQSO) into respective, divided data strobe signals, QO1 through QOn, each having a lower frequency. Each one of the second plurality of input amplifiers 16-1 through 16-n receives, amplifies, and outputs a difference between a divided data strobe signal portion received from divider 18 and a reference voltage (not shown). Respective driving current sources (e.g., I11 and I21) generate a driving current in response to voltages generated by a corresponding one of the second plurality of differential input amplifiers (e.g., 16-1).

Each one of the signal level detecting circuits 29-1 through 29-n preferably includes parallel resistors (e.g., R11 and R12) that divide respective voltages apparent on individual lines from the differential signal pairs 40. Each one of the plurality of second differential input amplifiers 26-1 through 26-n, receives and amplifies a difference between a voltage developed in an associated signal level detecting circuit (e.g., 29-1) and a reference voltage (not shown) to generate a respective data strobe signal portion, QI1 through QIn.

Multiplier 28 receives and multiplies the relatively low frequency, "n" data strobe signal portions, QI1 through QIn, output from the second plurality of differential input amplifiers 26-1 through 26-n to generate a data input strobe signal (DQSI) having a higher frequency. That is, multiplier 28 performs a frequency restoring function which converts "n" low frequency, data strobe signal portion, QI1 through Qin, into a high frequency data input strobe signal (DQSI) which is identical to the data output strobe signal (DQSO) apparent in transmitter 100.

An exemplary data transmission operation will now be described in the context of the data transmission system shown in FIG. 2.

When respective data pairs DO1,DO1B through DOn, DOnB and a data output strobe signal DQSO are generated in transmitter 100, the first plurality of 10 differential output amplifiers 12-1 through 12-n amplify signal differences between the data pairs DO1,DO1B through DOn,DOnB, and thereafter output differential signal pairs using respective differential signal line pairs 40. Thus, differential data signals having high noise immunity are transmits on the differential signal line pairs 40.

Divider 18 divides the relatively high frequency data output strobe signal (DQSO) to generate "n", low frequency, divided data strobe signal portions QO1 through QOn. That is, divider 18 converts the high frequency data output strobe signal (DQSO) into "n", low frequency, divided data strobe signal portions, QO1 through QOn because the higher frequency data output strobe signal (DQSO) is adversely affected by a noise when transmitted through the differential signal line pair 40.

The second plurality of differential output amplifiers 16-1 through 16-n respectively compare the "n"divided data strobe signal portions, QO1 to QOn, generated by divider 18 to a reference voltage (not shown) in order to generate output control signals (voltages) applied to the signal level varying circuits.

The respective driving current sources I11,I21 through I1n, I2n operate to vary currents flowing from differential signal line pairs 40 in response to the output control signals received from differential output amplifiers 16-1 through 16-n, respectively, as determined by the divided data strobe signal portions, QO1 through QOn. Thus, as current is drawn from a line pair of differential signal line pairs 40, a corresponding voltage apparent on the differential signal line pair is reduced accordingly. That is, a difference signal for the differential signal line pairs 40 maintains the same voltage value.

The signal level detecting circuits 29-1 through 29-n divide voltage differences of the differential signal line pairs 40 to generate divided voltages, respectively. Consequently, the signal level detecting circuits 29-1 through 29-n detect signal levels on the differential signal line pairs 40, respectively. The first plurality of differential input amplifiers 22-1 through 22-n amplify the signal differences apparent on the differential signal line pairs 40 to generate input data signals DI1 though DIn, respectively. The second plurality of differential input amplifiers 26-1 through 26-n amplify voltage differences between divided voltages outputted from the signal level detecting circuits 29-1 through 29-n and a reference voltage (not shown) to generate "n" data strobe signal portions QI1 through QIn, respectively. That is, the second plurality of differential input amplifiers 26-1 through 26-n detect and amplify a voltage level variation of the differential signal line pairs 40, respectively. Multiplier 28 combines the "n", low frequency, data strobe signal portions, QI1 through QIn outputted from the second plurality of differential input amplifiers 26-1 to 26-n to generate the high frequency, data input strobe signal (DQSI).

Therefore, a data transmission system according to the present invention can simultaneously transmit differential data and a related data output strobe signal through differential signal line pairs, so as to reduce the overall number of signal lines required by the system. Additionally, the data transmission system according to the present invention converts a high frequency data output strobe signal (DQSO) into a lower frequency set of signal portions, thereby reducing data transmission errors associated with the DQSO.

Figure 3:
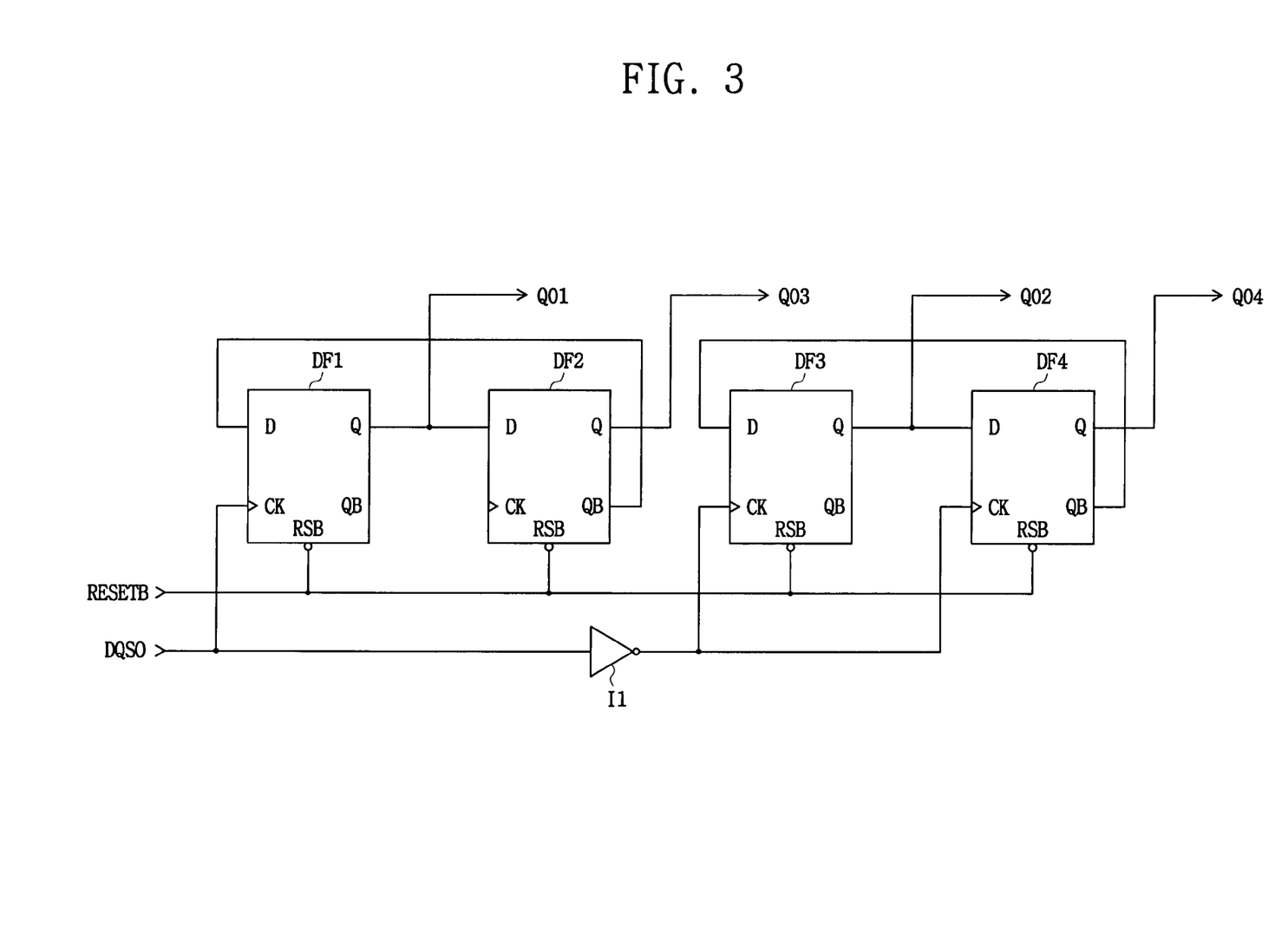
FIG. 3 is a block diagram illustrating a divider of the data transmission system of FIG. 2.

FIG. 3 is a block diagram further illustrating the divider 18 of FIG. 2. The divider circuit preferably includes a plurality of D flip-flops, DF1 through DF4, and an inverter I1.

In operation, D flip-flops DF1 and DF3 are each reset in response to a reset signal RESETB, and receive data to generate output signals QO1 and QO3 in response to the data output strobe signal DQSO. In contrast, D flip-flops DF2 and DF4 are each reset in response to a reset signal RESETB, and receive data to generate output signals QO2 and QO4 in response to the data output strobe signal DQSO inverted by the inverter I1.

The divider circuit of FIG. 3 sequentially outputs four output data pairs DO1,DO1B to D04,DO4B in response to the rising and falling edges (signal transitions) of the data output strobe signal DQSO.

Figure 4:
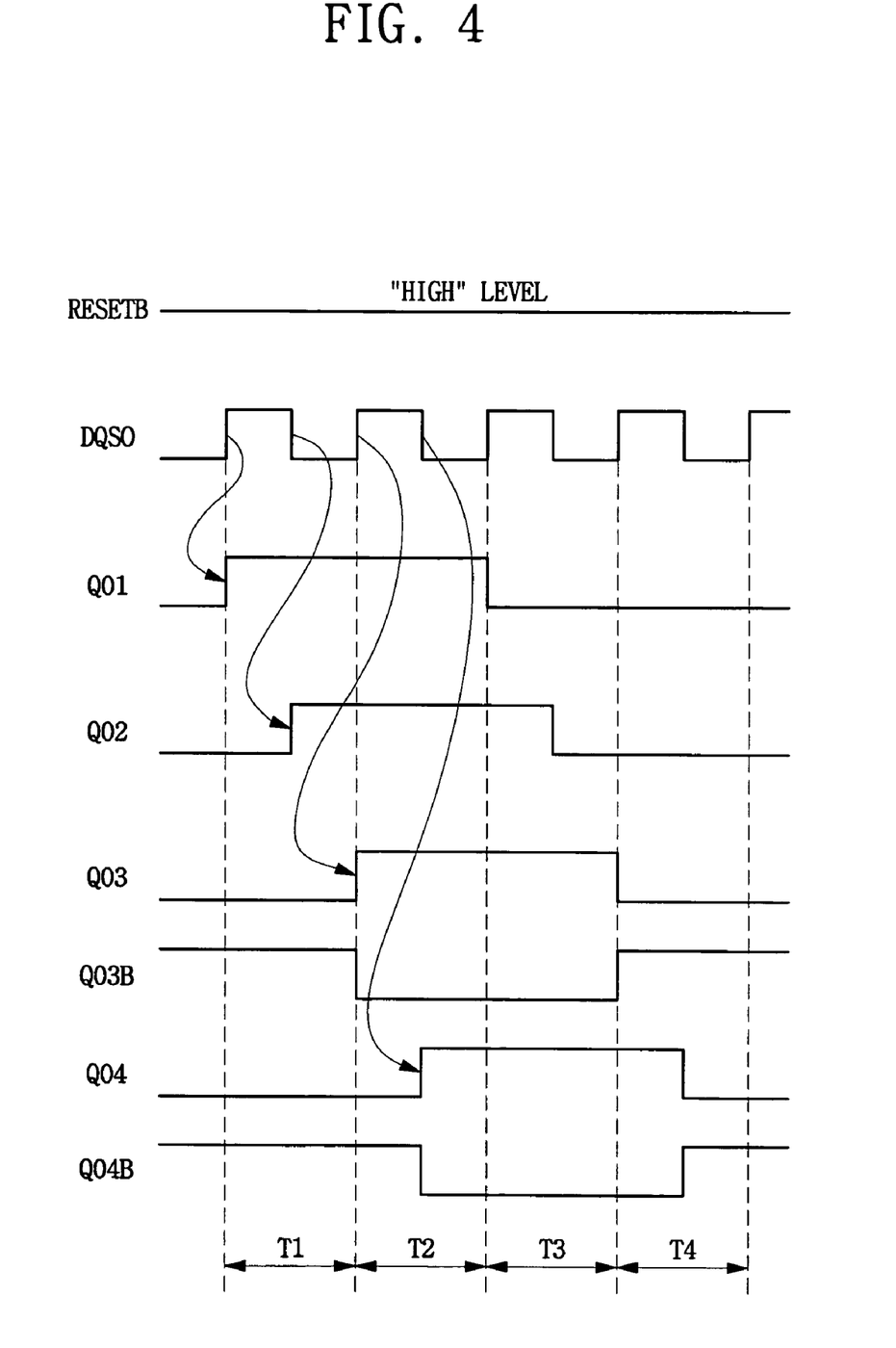
FIG. 4 is a timing diagram illustrating operation of the divider of FIG. 3.

FIG. 4 is a timing diagram further illustrating the operation of the divider circuit shown in FIG. 3. A reset signal RESETB is internally generated by transmitter 100 and receiver 200 when a power up signal is generated or data is output.

The D flip-flops DF1 to DF4 are reset to generate output signals QOI through QO4 at a "low" logic level, and inverted output signals QO1B through QO4B ay a "high" logic level in response to a low reset signal RESETB. The D flip-flops DF1 through DF4 are released from a reset state in response to a high reset signal RESETB.

During a first time period T1, D flip-flops DF1 and DF2 generate an inverted high output signal for D flip-flop DF2 and an low output signal for D flip-flop DF1 as output signals QO1 and QO3 in response to a rising edge of the data output strobe signal DQSO, respectively. Also, D flip-flops DF3 and DF4 generate an inverted high output signal for D flip-flop DF3 and a low output signal for D flip-flop DF4 as output signals QO2 and QO4 in response to a falling edge of the data output strobe signal DQSO, respectively. Therefore, D flip-flop DF1 transitions to a high output signal QO1 in response to a rising edge of the data output strobe signal DQSO, and D flip-flop DF3 transitions to a high output signal QO2 in response to a falling edge of the data output strobe signal DQSO.

During a second time period T2, D flip-flops DF1 and DF2 generate an inverted, high output signal for D flip-flop DF2 and a high output signal for D flip-flop DF1 as output signals QO1 and QO3 in response to a rising edge of the data output strobe signal DQSO, respectively. Also, D flip-flops DF3 and DF4 generate an inverted, high output signal for D flip-flop DF4 and a high output signal for D flip-flop DF3 as output signals QO2 and QO4 in response to a falling transition of the data output strobe signal DQSO, respectively. Therefore, D flip-flop DF2 transitions to a high output signal QO3 in response to a rising edge of the data output strobe signal DQSO, and D flip-flop DF4 transitions an to a high output signal QO4 in response to a falling edge of the data output strobe signal DQSO.

During a third time period T3, D flip-flops DF1 and DF2 generate a low output signal QO1 and a high output signal QO3 in response to a rising edge of the data output strobe signal DQSO, respectively. Also, D flip-flops DF3 and DF4 generate a low output signal QO2 and a high output signal QO4 in response to a falling edge of the data output strobe signal DQSO, respectively. Therefore, D flip-flop DF1 transitions to a low output signal QO1 in response to a rising edge of the data output strobe signal DQSO, and D flip-flop DF3 transitions to a low output signal QO2 in response to a falling edge of the data output strobe signal DQSO.

During a fourth time period T4, D flip-flops DF2 and DF4 generate a low output signal QO1 and a low output signal QO3 in response to a rising edge of the data output strobe signal DQSO, respectively. Also, D flip-flops DF3 and DF4 generate a low output signal QO2 and a low output signal QO4 in response to a falling edge of the data output strobe signal DQSO, respectively. Therefore, D flip-flop DF2 transitions to a low output signal QO3 in response to a rising edge of the data output strobe signal DQSO, and D flip-flop DF4 transitions to a low output signal QO4 in response to a falling edge of the data output strobe signal DQSO.

Therefore, the divider circuit preferred in the present invention divides the data output strobe signal DQSO into two to sequentially generate output signals QO1 to QO4 having a period twice that of the DQSO.

Figure 5:
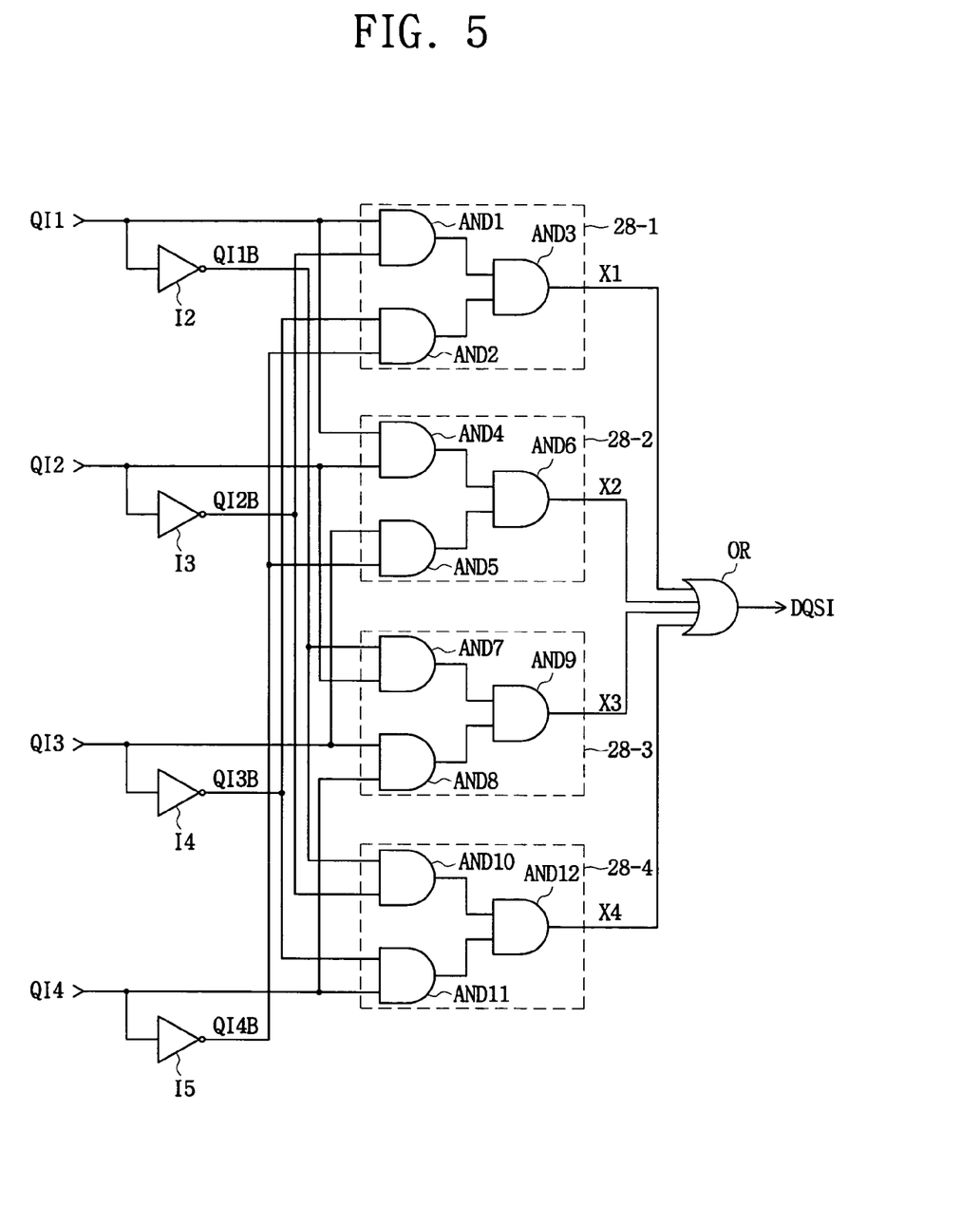
FIG. 5 is a logic diagram illustrating a multiplier of the data transmission system of FIG. 2.

FIG. 5 is a logic diagram illustrating the multiplier of FIG. 2. The multiplier of FIG. 5 includes inverters 12 to 15, AND circuits 28-1 to 28-4, and an OR gate OR. The AND circuits 28-1 includes an AND gate 1 to an AND gate 3, the AND circuits 28-2 includes an AND gate 4 to an AND gate 6, the AND circuits 28-3 includes an AND gate 7 to an AND gate 9, and the AND circuits 28-4 includes an AND gate 10 to an AND gate 12.

The multiplier circuit 28 shown in the example illustrated in FIG. 2 will be further described with reference to the circuit shown in FIG. 5.

Inverters 12 through 15 invert signals QI1 to QI4 to generate inverted signals QI1B to QI4B, respectively. The AND circuit 28-1 ANDs signals QI1, QI2B, QI3B and QI4B to generate a signal X1. The AND circuit 28-2 ANDs signals QI1, QI2, QI3, and QI4B to generate a signal X2. The AND circuit 28-3 ANDs signals QI1B, QI2, QI3, and QI4 to generate a signal X3. The AND circuit 28-4 ANDs signals QI1B, QI2B, QI3B, and QI4 to generate a signal X4. The OR gate OR ORs signals X1 to X4 to generate a data input strobe signal DQSI.

The multiplier of FIG. 5 generates a signal DQSI of the same form as the data output strobe signal DQSO when signals QO1 to QO4 of the same form as the signals QI1 to QI4 are inputted.

Figure 6:
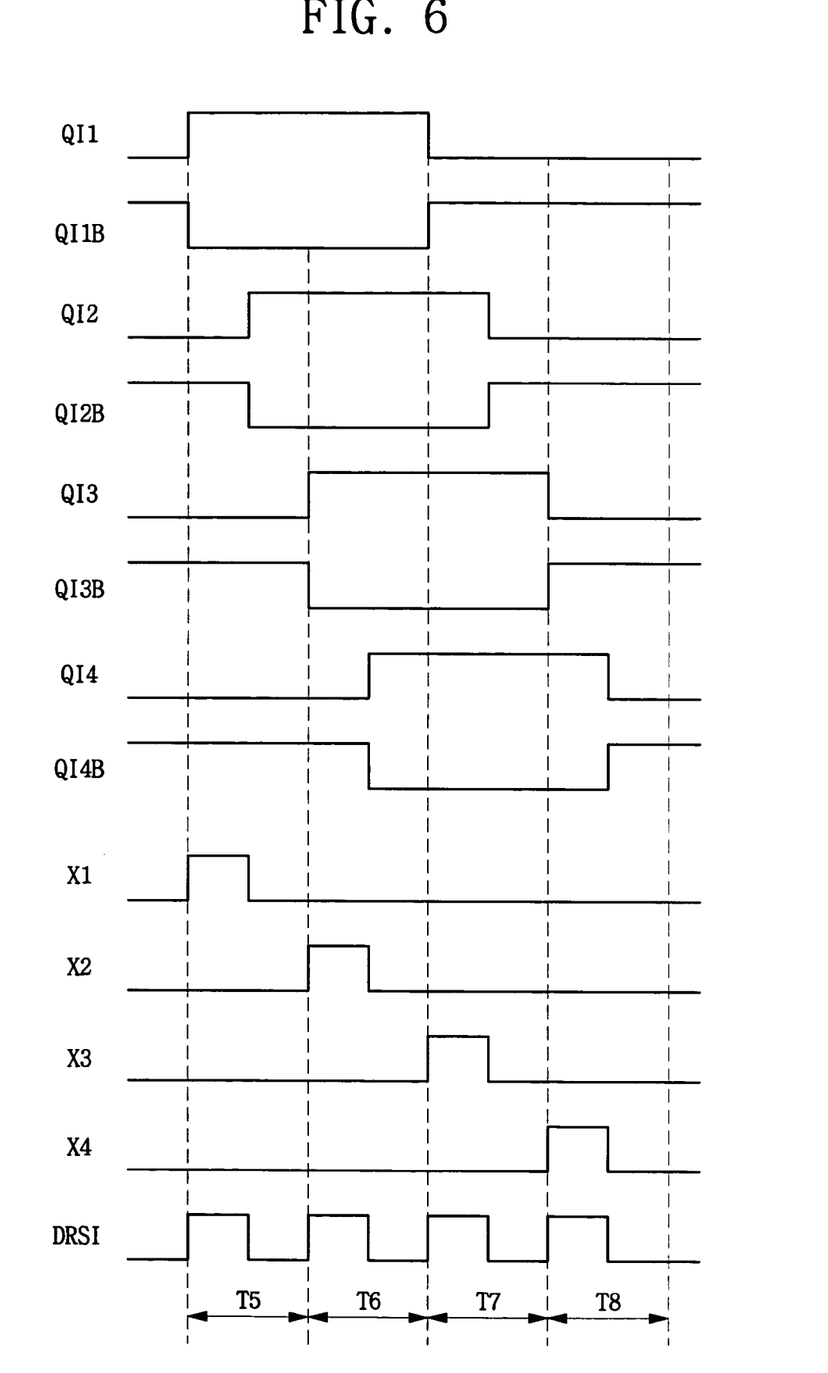
FIG. 6 is a timing diagram illustrating operation of the multiplier of FIG. 5.

FIG. 6 is a timing diagram further illustrating operation of the multiplier of FIG.5.

During a fifth time period T5, the AND circuit 28-1 generates a high signal X1 in response to high signals QI1, QI2B, QI3B, and QI4B, and the OR gate generates a high data input strobe signal DQSI in response to the high signal X1.

During a sixth time period T6, AND circuit 28-2 generates a high signal X2 in response to high signals QI1, QI2, QI3, and QI4B, and the OR gate generates a high data input strobe signal DQSI in response to the high signal X2.

During a seventh time period T7, AND circuit 28-3 generates a high signal X3 in response to high signals QI1B, QI2, QI3, and QI4B, and the OR gate generates a high data input strobe signal DQSI in response to the high signal X3.

During an eighth time period T8, AND circuit 28-4 generates a high signal X4 in response to high signals QI1B, QI2B, QI3B, and QI4, and the OR gate generates a high data input strobe signal DQSI in response to the high signal X4.

Therefore, the multiplier currently preferred in the present invention combines 4 signals QI1B, QI2B, QI3B, and QI4B to generate one data input strobe signal DQSI which is multiplied by 2.

In a data transmission system according to the present invention, a high frequency data output strobe signal is divided and converted into low frequency divided data strobe signal portions by the divider circuit, and then transmitted via a differential signal line pair. Once received in a corresponding receiver, the low frequency divided data strobe signal portions are re-converted into a high frequency data input strobe signal by the multiplier circuit.

Figure 7:
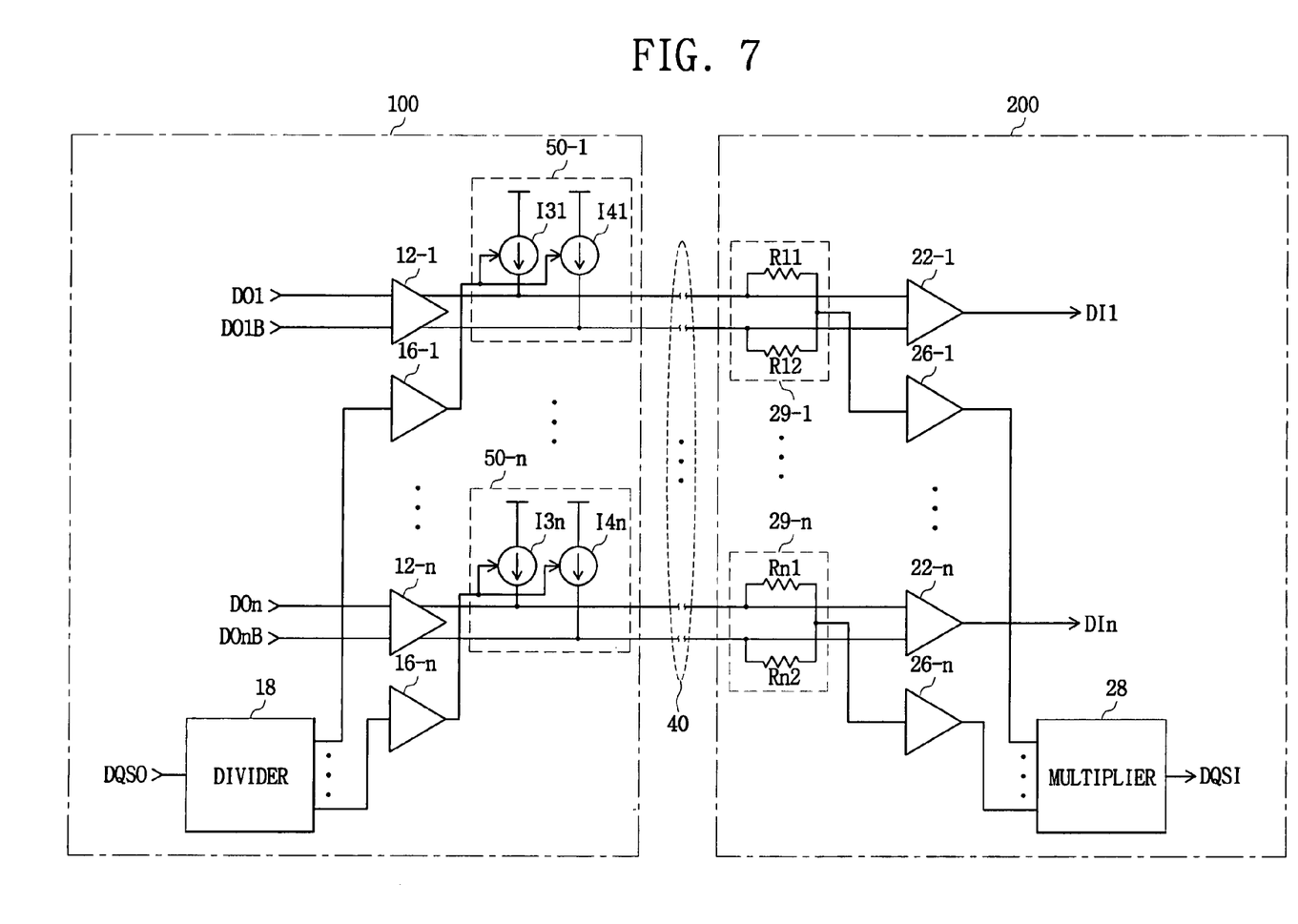
FIG. 7 is a block diagram illustrating a data transmission system according to a second embodiment of the present invention.

FIG. 7 is a block diagram illustrating a data transmission system according to a second embodiment of the present invention. The data transmission system of FIG. 7 includes signal level varying circuits 50-1 through 50-n comprising driving current sources I31,I41 through I3n,I4n instead of the signal level varying circuits 18-1 through 18-n and the constituent driving current sources I11,I21 through I1n,I2n, as shown in the example of FIG. 2.

The functions and interoperation of components of the data transmission system of FIG. 7 will now be explained. Again, like reference numerals, as between FIGS. 2 and 7, denote like parts and perform like functions. In further detail, the function of the driving current sources I31,I41 through I3n, I4n is explained below.

Driving current sources I31,I41 through I3n,I4n drive currents onto the differential signal line pairs 40, respectively. Whereas driving current sources I11,I21 through I1n,I2n of FIG. 2 function to decrease currents flowing through the differential signal line pairs 40 by an equal amount, driving current sources I31,I41 through I3n,I4n function to increase the current flowing through the differential signal line pairs 40 by an equal amount.

Therefore, in a case where data is transmitted through the differential signal line pairs 40, and where the data output strobe signal DQSO is generated, currents flowing through the differential signal line pairs 40 are increased or decreased by an equal same in accordance with the nature and composition of a corresponding signal level varying circuit.

A exemplary data transmission operation for the data transmission system of FIG. 7 is explained below.

When data DO1,DO1B through DOn,DOnB and a data output strobe signal DQSO are internally generated in transmitter 100, the first plurality of differential output amplifiers 12-1 to 12-n, the divider 18, and the second plurality of differential output amplifiers 16-1 to 16-n perform the same operation as those of FIG. 2 to transmit signals via the differential signal line pairs 40. As a result, a difference signal is generated between each of the differential signal line pairs 40. The driving current sources I31,I41 through I3n,I4n operate to vary currents flowing through the differential signal line pairs 40 in response to output control signals (voltages) applied by of the second plurality of differential output amplifiers 16-1 to 16-n. Thus, when currents of the differential signal line pairs 40 are increased by the same amount, voltage levels are also increased by the same value by an increase of current. That is, the differential signal line pairs increase voltage levels by the same value while maintaining the same voltage difference. The signal level detecting circuits 29-1 through 29-n divide voltage differences of the differential signal line pairs 40 to generate divided voltages, respectively. The first plurality of differential input amplifiers 22-1 to 22-n, the second plurality of differential input amplifiers 26-1 to 26-n, is and the multiplier 28 perform the same operation as those of FIG. 2 to generate data DI1 to Din and a data input strobe signal DQSI. That is, the data DI1 to Din and the data input strobe signal DQSI are internally generated in receiver 200.

The data transmission system of the present invention can simultaneously transmit data and data output strobe signal through the differential signal line pairs, thereby reducing the number of signal lines.

The data transmission system of the present invention converts the high frequency data transmission strobe signal into low frequency divided data strobe signal portions and transmits these signals via the differential signal line pairs 40, thereby reducing data transmission errors resulting from a noise.

Alternatively, the data transmission system of the present invention can be configured with both the driving current sources I11,I21 through I1n,I2n of FIG. 2 and the driving current sources I31,I41 through I3n,I4n of FIG. 7 in order to fully control the differential signal line pairs 40.

Figure 8:
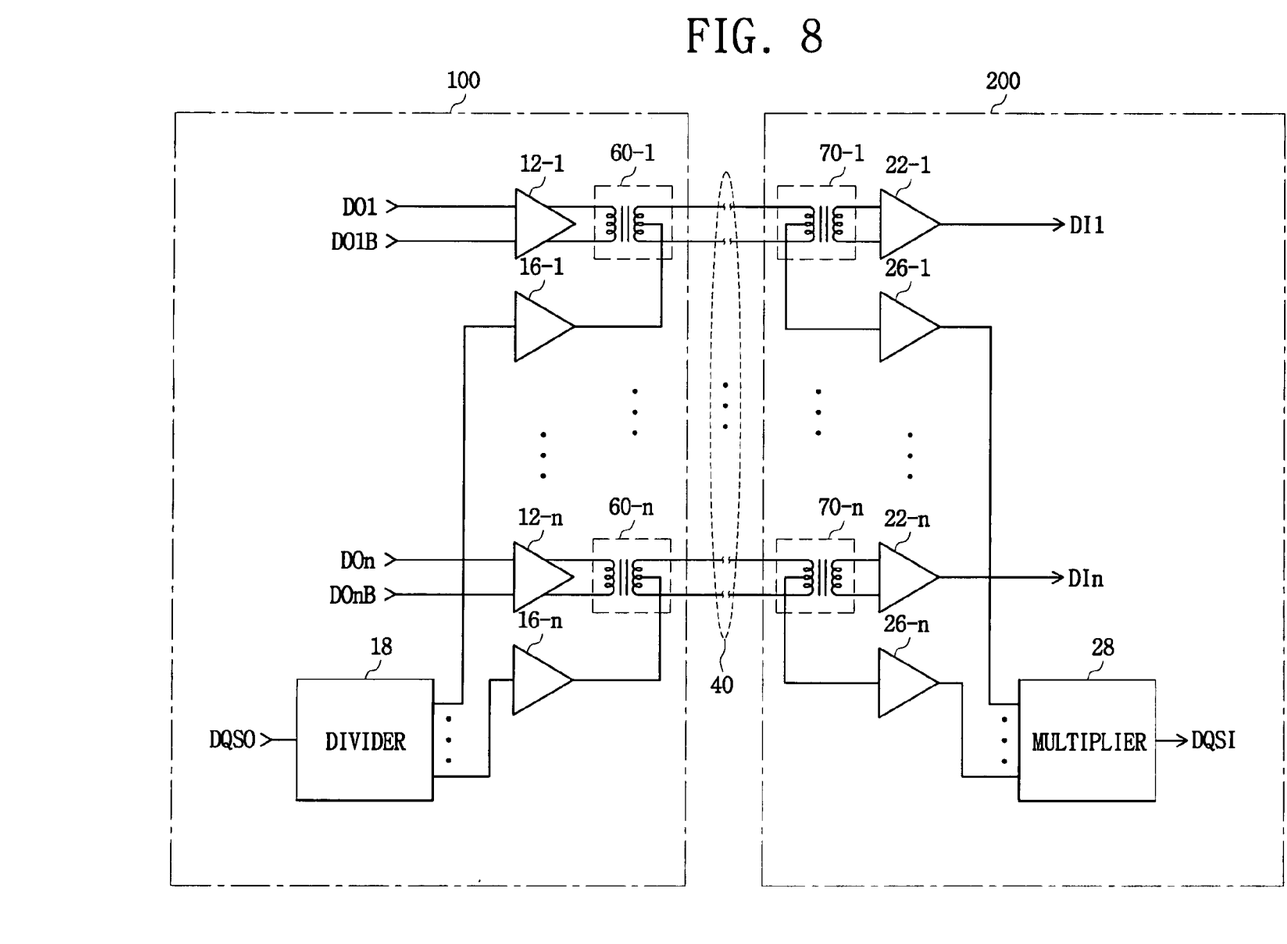
FIG. 8 is a block diagram illustrating a data transmission system according to a third embodiment of the present invention.

FIG. 8 is a block diagram illustrating a data transmission system according to a third embodiment of the present invention. The data transmission system of FIG. 8 includes transformers 60-1 to 60-n and transformers 70-1 to 70-n, respectively, instead of the signal level varying circuits 50-1 to 50-n and the signal level detecting circuits 29-1 to 29-n of FIG. 7.

In FIG. 8, respective primary windings of transformers 60-1 through 60-n are connected to the output of a respective differential output terminal pairs of the first plurality of differential output amplifiers 12-1 through 12-n, and a respective secondary windings are connected to between the respective differential signal line pairs 40. Respective output signals (voltages) of the second plurality of differential output amplifiers 16-1 through 6-n are applied to center taps of respective secondary windings of the transformers 60-1 through 60-n. Primary windings of the transformers 70-1 through 70-n are connected between respective differential signal line pairs 40, and respective secondary windings are connected between respective differential input terminal pairs of the first plurality of differential input amplifiers 22-1 through 22-n. Signals outputted from center taps of the respective primary windings of the transformers 70-1 through 70-n are applied to respective input terminals of the second plurality of differential input amplifiers 26-1 through 26-n.

Like reference numerals of FIGS. 2 and 8 denote like parts and perform like operations, and thus functions of the transformers 60-1 through 60-n and 70-1 through 70-n are explained below.

Transformers 60-1 through 60-n transfer voltages of differential output signal pairs of the first plurality of differential output amplifiers 12-1 through 12-n to the differential signal line pairs 40, respectively. As a result, a signal difference occurs between the respective differential signal line pairs 40. When respective output voltages of the second plurality of differential output amplifiers 16-1 through 16-n are applied to center taps of the respective transformers 60-1 through 60-n, voltages of the respective differential signal line pairs 40 are varied by the same value while maintaining the same voltage difference.

Transformers 70-1 through 70-n transfer voltages of the respective differential signal line pairs 40 to respective differential input terminal pairs of the first plurality of differential input amplifiers 22-1 to 22-n. Also, signals of center taps of the primary windings of the transformers 70-1 through 70-n are transmitted to the second plurality of differential input amplifiers 26-1 to 26-n, respectively. That is, voltage levels of center taps of the primary windings of the transformers 70-1 through 70-n are applied to the differential input amplifiers 26-1 through 26-n, respectively.

Therefore, the data transmission system of FIG. 8 can simultaneously transmit data and data output strobe signal through the differential signal line pairs 40 like those of FIGS. 2 and 7.

Also, the data transmission system described above is described such that the data output strobe signal DQSO is internally generated in the transmitter 100 but can be applied to a case that the data output strobe signal pair DQSO,DQSOB is internally generated in the transmitter 100.

Figure 9:
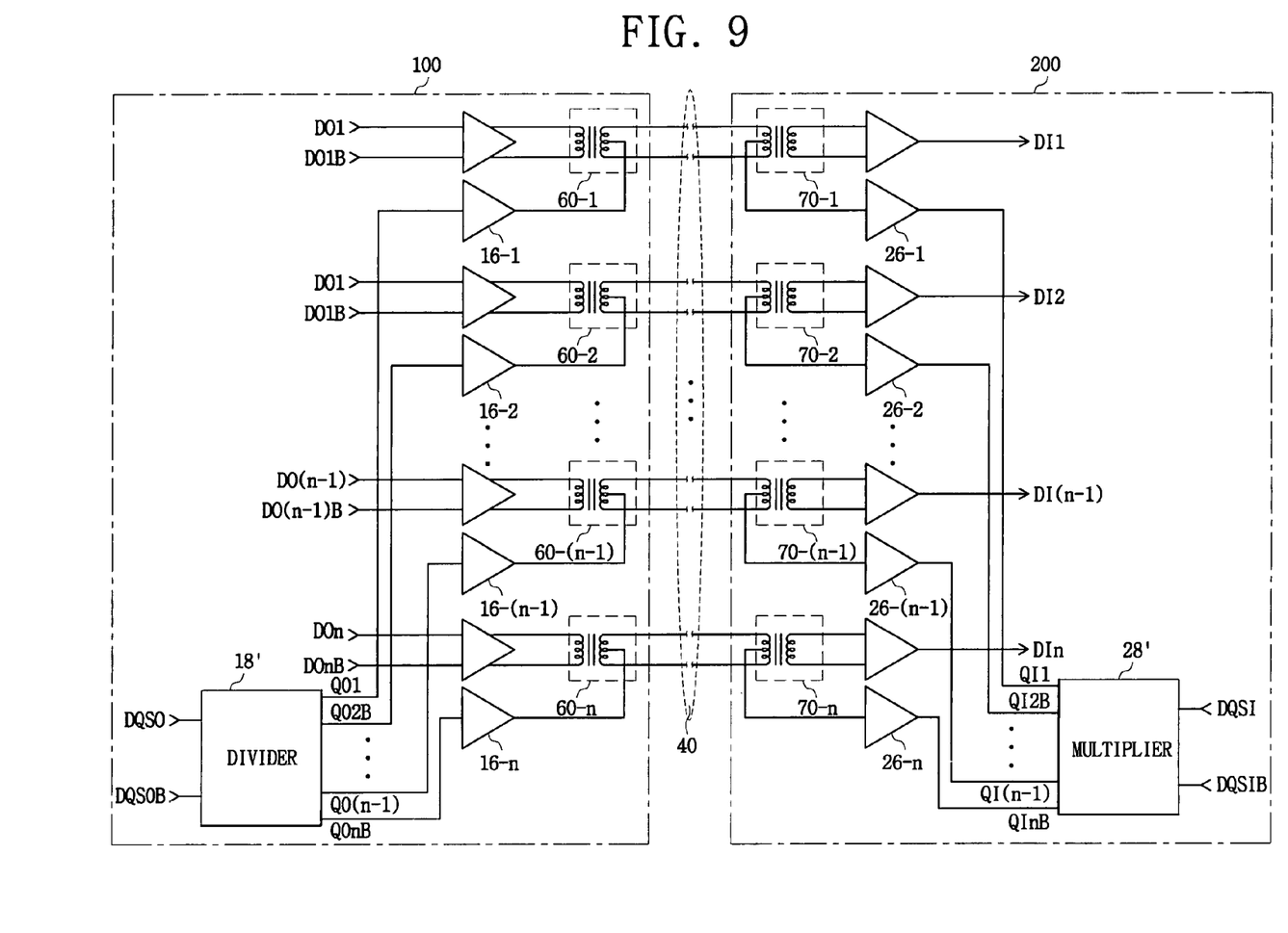
FIG. 9 is a block diagram illustrating a data transmission system according to a fourth embodiment of the present invention.

FIG. 9 is a block diagram illustrating a data transmission system according to a fourth embodiment of the present invention. The data transmission system of FIG. 9 includes a divider 18' and a multiplier 28', respectively, instead of divider 18 and multiplier 28 of FIG. 8.

Like reference numerals of FIGS. 8 and 9 denote like parts and perform like operation, and thus functions of the divider 18' and the multiplier 28' are explained below.

Divider 18' divides a data output strobe signal pair DQSO, DQSOB to generate "n" output signals QO1,DO2B, . . . ,QI(n-1), and DInB. Multiplier 28' multiplies the "n" signals QO1,DO2B, . . . ,QI(n-1), and DInB to generate a data input strobe signal pair DQSI and DQSIB.

The data transmission system of FIG. 9 can simultaneously transmit data and data output strobe signal through the differential signal line pairs 40 like those of FIGS. 2 and 7.

Alternatively, the data transmission system of FIG. 9 can be configured such that the transformers 60-1 through 60-n are replaced with current drivers of FIG. 2 or 7 and the transformers 70-1 through 70-n are replaced with voltage dividers of FIG. 2 or 7.

The data transmission system according to the present invention converts a high frequency, single level, data output strobe signal into a low frequency signal better adapted to transmission via one or more differential signal line pairs, thereby reducing data transmission errors resulting from a noise which may occur when a single level of a signal is transmitted. As noted above, the data transmission system and method according to the present invention can simultaneously transmit data and data strobe signal through the differential signal line pairs. Therefore, there is no need for addition of signal lines to transmit the data strobe signal. Further, the data transmission system and method convert data output strobe signal of high frequency into a signal of low frequency to be transmitted to the differential signal line pairs, thereby reducing data transmission errors.

What is claimed is:

1. A data transmission system, comprising:
   a transmitter comprising;
      a divider circuit converting a data output strobe signal into a plurality of divided data strobe signals, each divided data strobe signal having a lower frequency than the data output strobe signal,
      a first plurality of differential output amplifiers transmitting differential data signals via a plurality of differential signal line pairs,
      a second plurality of differential output amplifiers, each one of the second plurality of differential output amplifiers receiving the divided data strobe signal and generating an output control signal, and
      a plurality of signal level varying circuits, wherein each signal level varying circuit variably current loads a corresponding differential signal line pair in responsive to the output control signal received from a corresponding one of the second plurality of differential output amplifiers; and
   a receiver comprising;
      a first plurality of differential input amplifiers receiving the differential data signals from the plurality of differential signal line pairs,
      a plurality of signal level detecting circuits, each signal level detecting circuit detecting a variation in the differential data signals on a corresponding differential signal line pair and generating an input control signal in response to the variation;
      a second plurality of differential input amplifiers, each one of the second plurality of differential input amplifiers receiving the input control signal from a corresponding signal level detecting circuit and generating a corresponding data strobe signal portion, and
      a multiplier receiving a plurality of data strobe signal portions from the second plurality of differential input amplifiers, and generating a data input strobe signal having a higher frequency than the plurality of data strobe signal portions and corresponding to the data output strobe signal.

2. The system of claim 1, wherein the data output strobe signal of the transmitter is a clock signal used as a reference to respectively output the differential data signals from the plurality of differential signal line pairs.

3. The system of claim 1, wherein the data input strobe signal is a clock signal used as a reference to respectively receive the differential data signals.

4. The system of claim 1, wherein the divider circuit comprises a frequency conversion circuit dividing the data output strobe signal into a plurality of lower frequency divided data strobe signals.

5. The system of claim 4, wherein the plurality of divided data strobe signals vary in relation to the data output strobe signal.

6. The system of claim 1, wherein each signal level varying circuit comprises:
   first and second current drivers respectively connected between a corresponding signal line in a differential signal line pair and a ground voltage and applying a subtractive loading current to the corresponding signal line in response to an input control signal received from a corresponding one of the second plurality of differential output amplifiers.

7. The system of claim 1, wherein each signal level varying circuit comprises:
   first and second current drivers respectively connected between a source voltage and a corresponding signal line in a differential signal line pair applying an additive loading current to the corresponding signal line in response to an input control signal received from a corresponding one of the second plurality of differential output amplifiers.

8. The system of claim 1, wherein each signal level varying circuit comprises:
   first and second subtractive current drivers respectively connected between a corresponding signal line in a differential signal line pair and a ground voltage and applying a subtractive loading current to the corresponding signal line in response to an input control signal received from a corresponding one of the second plurality of differential output amplifiers; and,
   first and second additive current drivers respectively connected between a source voltage and a corresponding signal line in a differential signal line pair applying an additive loading current to the corresponding signal line in response to an input control signal received from a corresponding one of the second plurality of differential output amplifiers.

9. The system of claim 1, wherein each signal level detecting circuit comprises:
   a plurality of voltage dividers respectively connected between a corresponding signal line in a differential signal line pair and one of the second plurality of differential input amplifiers.

10. The system of claim 9, wherein the plurality of voltage dividers comprises at least two resistors.

11. The system of claim 1, wherein each signal level varying circuit comprises:
    a first transformer having primary windings respectively connected to output terminals of a corresponding one of the first plurality of differential output amplifiers, secondary windings respectively connected to signal lines forming a differential signal line pair, and a secondary winding center tap connected to a corresponding one of the second plurality of differential amplifiers.

12. The system of claim 11, wherein each signal level detecting circuit comprises:
    a second transformer having primary windings respectively connected to signal lines forming a differential signal line pair, secondary windings respectively connected to inputs of one of the first plurality of differential input amplifiers, and a primary windings center tap connected to an input of one of the second plurality of differential input amplifiers.

13. A data transmission system, comprising:
    a plurality of differential output signal pairs, wherein each one of the plurality of differential output signal pairs communicates differential data signals between a transmitter to a receiver;
    wherein the transmitter generates a data output strobe signal and the receiver is responsive to a data input strobe signal corresponding to the data output strobe signal;
    wherein the data output strobe signal is frequency divided into a plurality of divided data strobe signals, each one of the of divided data strobe signals varying the voltage level of a corresponding set of differential data signals in response to variations in the data output strobe; and, wherein the receiver further comprises a multiplier circuit generating the data input strobe signal in response to detected variations in the voltage of the differential data signals.

14. A data transmission method, comprising:

frequency converting a data output strobe signal to generate a plurality of divided data strobe signals;

transmitting a plurality of differential data signals via a corresponding plurality of differential output signal pairs, wherein the voltage level of each differential data signal is varied in accordance with a divided data strobe signal;

receiving the plurality of differential data signals via the corresponding plurality of differential output signal pairs;

detecting variations in the voltage level of each one of the plurality of differential data signals; and, generating a data input strobe signal in response to the detected variations in the voltage level of each one of the plurality of differential data signals.

15. The method of claim 14, wherein the data output strobe signal is a clock signal used as a reference to output the plurality of differential data signals.

16. The method of claim 14, wherein the data input strobe signal is a clock signal used as a reference to respectively receive the plurality of differential data signals.

17. The method of claim 14, wherein the divided data strobe signals have a lower frequency than the data output strobe signal.

18. The method of claim 14, wherein the step of generating the data input strobe signal comprises:

generating a plurality of data strobe signal portions and multiplying the plurality of data strobe signal portions into a data input strobe signal that corresponds to the data output strobe signal.

19. The method of claim 14, wherein the voltage level of each differential data signal is varied by applying an additive current to each signal line in the plurality of differential signal line pairs.

20. The method of claim 14, wherein the voltage level of each differential data signal is varied by applying a subtractive current to each signal line in the plurality of differential signal line pairs.

* * * * *